US012632364B2

(12) United States Patent
Liu et al.

(10) Patent No.: US 12,632,364 B2
(45) Date of Patent: May 19, 2026

(54) AUTOMATIC RUNTIME PREEMPTIVE ALERT

(71) Applicant: International Business Machines Corporation, Armonk, NY (US)

(72) Inventors: Dong Hui Liu, Beijing (CN); Jing Lu, Beijing (CN); Peng Hui Jiang, Beijing (CN); Xiao Yan Tang, Beijing (CN); Jun Su, Beijing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 18/369,292

(22) Filed: Sep. 18, 2023

(65) Prior Publication Data
US 2025/0094316 A1     Mar. 20, 2025

(51) Int. Cl.
*G06F 11/36*          (2025.01)
*G06F 11/3604*        (2025.01)

(52) U.S. Cl.
CPC ................................. *G06F 11/3612* (2013.01)

(58) Field of Classification Search
CPC ...................................................... G06F 11/36
See application file for complete search history.

(56) References Cited

U.S. PATENT DOCUMENTS 10,437,578 B2    10/2019  Hu et al.
10,877,863 B2    12/2020  Choi et al.

11,108,793 B2     8/2021  Movsisyan
11,150,974 B2    10/2021  Velipasaoglu et al.
11,558,272 B2     1/2023  Ranjan et al.
2007/0220513 A1   9/2007  Hwang
(Continued)

FOREIGN PATENT DOCUMENTS

WO        2025/061645 A1     3/2025

OTHER PUBLICATIONS

Grigsby, J., "Multivariate Time Series Forecasting with Transformers", https://towardsdatascience.com/multivariate-time-series-forecasting-with-transformers-384dc6ce989b, Published in Towards Data Science, Oct. 29, 2021, 22 pages.
(Continued)

*Primary Examiner* — Jae U Jeon
(74) *Attorney, Agent, or Firm* — Scully, Scott, Murphy & Presser, P.C.; Lily Neff

(57)                ABSTRACT

For a set in sets of candidate factors, a classification model is trained to predict a computer problem possibility, an accuracy score of the classification model is determined based on model validation, and factor weights of the candidate factors in the set are adjusted based on the accuracy score. This processing is done with respect to all sets of candidate factors. A low accuracy classification model having an accuracy score lower than a threshold criterion is selected. A higher accuracy classification model having an accuracy score that is higher than the accuracy score of the low accuracy classification model is selected. The set of candidate factors used to train the low accuracy classification model is updated using one or more of the candidate factors used to train the higher accuracy classification model. The low accuracy classification model is updated based on the updated set of candidate factors.

20 Claims, 10 Drawing Sheets

(56) References Cited

U.S. PATENT DOCUMENTS

| | | | |
|---|---|---|---|
| 2008/0228675 A1* | 9/2008 | Duffy .................... | G06F 40/295 |
| | | | 707/999.005 |
| 2008/0250265 A1 | 10/2008 | Chang et al. | |
| 2019/0028492 A1 | 1/2019 | Coleman et al. | |
| 2020/0210764 A1* | 7/2020 | Hamedi ............. | G06Q 30/0269 |
| 2021/0200616 A1* | 7/2021 | Xu ....................... | G06F 11/3409 |
| 2022/0100737 A1 | 3/2022 | Nikitina et al. | |
| 2023/0154166 A1* | 5/2023 | Pauli ................. | G06V 10/7747 |
| | | | 340/568.1 |

OTHER PUBLICATIONS

Zhao, G., et al., "Predicting Performance Anomalies in Software Systems at Run-time", ACM Transactions on Software Engineering and Methodology, Jan. 2020, 33 pages.
International Searching Authority, "Notification of Transmittal of the International Search Report and the Written Opinion of the International Searching Authority, or Declaration," Patent Cooperation Treaty, Jan. 2, 2025, 10 pages, International Application No. PCT/ EP2024/075839.

* cited by examiner

AUTOMATIC RUNTIME PREEMPTIVE ALERT

BACKGROUND

The present application relates generally to computers and computer applications, and more particularly to distributed systems, machine learning, and providing automatic preemptive alert, for example, during runtime of computer systems.

BRIEF SUMMARY

The summary of the disclosure is given to aid understanding of a computer system and method of automatically providing preemptive alert, e.g., of system problems during runtime, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in some embodiments, includes selecting a plurality of sets of candidate factors, the candidate factors being indicators of computer performance, and where each set in the plurality of sets of candidate factors has a combination of candidate factors that is different from another set in the plurality of sets of candidate factors. The method also includes, for a set in the plurality of sets of candidate factors, training a classification model to predict a problem possibility during a computer runtime using a training dataset associated with the set, validating the classification model using a validation dataset associated with the set and determining an accuracy score associated with the classification model, and adjusting factor weights associated with the candidate factors in the set based on the accuracy score. The training of the classification model, the validation of the classification model, and the adjusting of the factor weights are repeated for all sets in the plurality of sets of candidate factors, where a plurality of classification models is trained corresponding to the respective plurality of sets of candidate factors. The method also include selecting from the plurality of classification models a low accuracy classification model having an accuracy score lower than a threshold criterion. The method also includes selecting from the plurality of classification models a higher accuracy classification model having an accuracy score that is higher than the accuracy score of the low accuracy classification model. The method also includes updating the set of candidate factors used to train the low accuracy classification model by replacing at least one candidate factor in the set of candidate factors used to train the low accuracy classification model with a candidate factor in the set of candidate factors used to train the higher accuracy classification model. The method also include updating the low accuracy classification model by repeating the training of the classification model, the validating of the classification model, and the adjusting of the factor weights, using the updated set of candidate factors.

In some embodiments, a system includes at least one computer processor. The system also includes at least one memory device coupled with the computer processor. The at least one computer processor is configured to select a plurality of sets of candidate factors, the candidate factors being indicators of computer performance, and where each set in the plurality of sets of candidate factors has a combination of candidate factors that is different from another set in the plurality of sets of candidate factors. The at least one computer processor is also configured to, for a set in the plurality of sets of candidate factors, train a classification model to predict a problem possibility during a computer runtime using a training dataset associated with the set, validate the classification model using a validation dataset associated with the set and determine an accuracy score associated with the classification model, and adjust factor weights associated with the candidate factors in the set based on the accuracy score, where the computer processor is configured to repeat the training of the classification model, the validation of the classification model, and the adjusting of the factor weights for all sets in the plurality of sets of candidate factors, where a plurality of classification models is trained corresponding to the respective plurality of sets of candidate factors. The at least one computer processor is also configured to select from the plurality of classification models a low accuracy classification model having an accuracy score lower than a threshold criterion. The at least one computer processor is also configured to select from the plurality of classification models a higher accuracy classification model having an accuracy score that is higher than the accuracy score of the low accuracy classification model. The at least one computer processor is also configured to update the set of candidate factors used to train the low accuracy classification model by replacing at least one candidate factor in the set of candidate factors used to train the low accuracy classification model with a candidate factor in the set of candidate factors used to train the higher accuracy classification model. The at least one computer processor is also configured to update the low accuracy classification model by repeating the training of the classification model, the validating of the classification model, and the adjusting of the factor weights, using the updated set of candidate factors.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
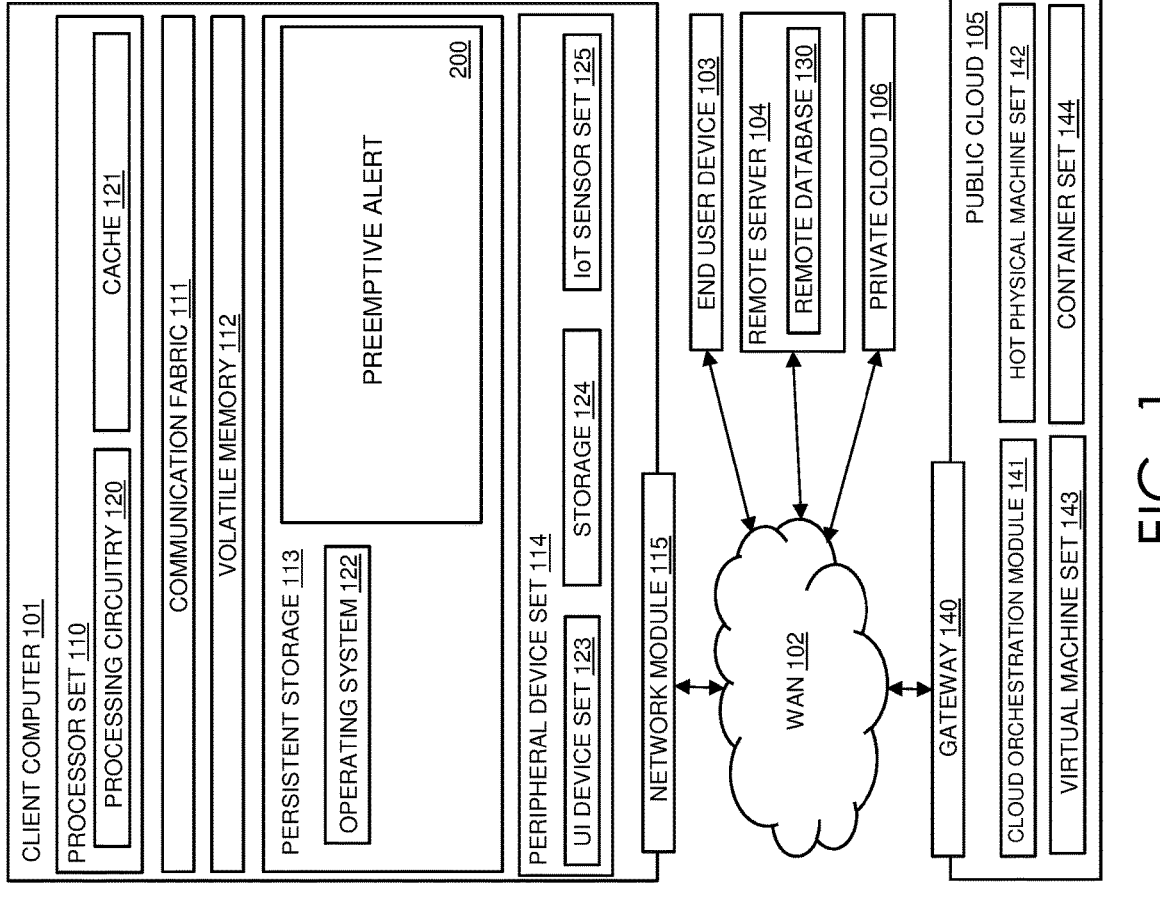
FIG. 1 shows an example of a computing environment, which can implement automatic preemptive alert of system problems during runtime in an embodiment.

A computer-implemented method, in some embodiments, includes selecting a plurality of sets of candidate factors, the candidate factors being indicators of computer performance, and where each set in the plurality of sets of candidate factors has a combination of candidate factors that is different from another set in the plurality of sets of candidate factors. The method also includes, for a set in the plurality of sets of candidate factors, training a classification model to predict a problem possibility during a computer runtime using a training dataset associated with the set, validating the classification model using a validation dataset associated with the set and determining an accuracy score associated with the classification model, and adjusting factor weights associated with the candidate factors in the set based on the accuracy score. The training of the classification model, the validation of the classification model, and the adjusting of the factor weights are repeated for all sets in the plurality of sets of candidate factors, where a plurality of classification models is trained corresponding to the respective plurality of sets of candidate factors. The method also include selecting from the plurality of classification models a low accuracy classification model having an accuracy score lower than a threshold criterion. The method also includes selecting from the plurality of classification models a higher accuracy classification model having an accuracy score that is higher than the accuracy score of the low accuracy classification model. The method also includes updating the set of candidate factors used to train the low accuracy classification model by replacing at least one candidate factor in the set of candidate factors used to train the low accuracy classification model with a candidate factor in the set of candidate factors used to train the higher accuracy classification model. The method also include updating the low accuracy classification model by repeating the training of the classification model, the validating of the classification model, and the adjusting of the factor weights, using the updated set of candidate factors.

The method in some embodiments may be able to identify problems in distributed and/or multi-cloud environments, even when symptoms are buried in floods of irrelevant data, huge volume, velocity, and overwhelming variety of data. The method in some embodiments may be able to prevent in advance, potential underlying issues, which may lead to high-level symptoms. In some embodiments, the method can automatically provide preemptive alert of computer system and/or application problems during runtime.

One or more of the following features can be separable or optional from each other. In some embodiments, the method also includes, for the set in the plurality of sets of candidate factors, training a transformer with encoder and decoder architecture to generate future values for at least some of the candidate factors in the set. The training of the transformer is repeated along with repeating of the training of the classification model, the validation of the classification model, and the adjusting of the factor weights, for all sets in the plurality of sets of candidate factors, where a plurality of transformers are trained corresponding to the respective plurality of sets of candidate factors. The updating of the low accuracy classification model includes updating the low accuracy classification model by repeating the training of the transformer, the training of the classification model, the validating of the classification model, and the adjusting of the factor weights, using the updated set of candidate factors. For instance, training a transformer allows for using the transformer for prediction with new unseen data, which can be used in candidate factor selection.

In some embodiments, the method further include passing a new set of feature values corresponding to the updated set of candidate factors to the transformer trained using the updated set of candidate factor to generate future values corresponding to the updated set of candidate factors, and using the generated future values as input to the updated low accuracy classification model to predict a future problem possibility. For instance, using a transformer for data prediction can boost the accuracy of the prediction.

In some embodiments, the method further includes repeating the selecting of the low accuracy classification model, the selecting of the higher accuracy classification model, the updating of the set of candidate factors used to train the low accuracy classification model, and the updating of the low accuracy classification model, until all low accuracy classification models in the plurality of classification models are updated. In this way, for example, all classification models can be improved, for example, to have an accuracy score above a threshold criterion.

In some embodiments, the candidate factors include factors having time series data values that change during a period of time and at least one factor having a data value that remains static during the period of time. In this way, the classification model can handle various types of factors, e.g., including time series data as well as static data.

In some embodiments, the transformer is a multi-head transformer with self-attention and cross attention, where the transformer generates the future values based on self-attention of individual time series data of multiple time series data input to the transformer and cross-attention among the multiple time series data. In this way, for example, more accurate future values may be generated based on self-attention as well as cross-attention across the candidate factors in a set. For instance, dependencies among candidate factors can be taken into account when generating future values of the individual candidate factors.

In some embodiments, the replacing of the at least one candidate factor in the set of candidate factors used to train the low accuracy classification model includes replacing the at least one candidate factor that has a lowest adjusted factor weight selected from the set of candidate factors used to train the low accuracy classification model, with the candidate factor that has a highest adjusted factor weight and that is not also in the set of candidate factors used to train the low accuracy classification model selected from the set of candidate factors used to train the higher accuracy classification. In this way, for example, one or more candidate factors that may contribute least to a classification model's decision-making can be replaced with one or more candidate factors that may contribute more to the classification model's decision-making.

In some embodiments, the adjusting of the factor weights includes adjusting factor weights of the candidate factors in the set used in the classification model by multiplying the accuracy score with the factor weights of the candidate factors. In this way, the weights of the individual candidate factors used in a classification model can be adjusted also based on the overall performance accuracy of the classification model.

A system including at least one computer processor and at least one memory device coupled with the at least one computer processor is also disclosed, where the at least one computer processor is configured to perform one or more methods described above. A computer program product is also disclosed that includes a computer readable storage medium having program instructions embodied therewith, where the program instructions are readable by a device to cause the device to perform one or more methods described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as preemptive alert algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In various embodiments, systems, methods and/or techniques are disclosed that automatically provide preemptive alert of one or more computer system and/or application problems during runtime. Systems, methods, and/or techniques, in some embodiment, randomly select and initialize time series factors and static factors to monitor, for example, for an individual system across multiple systems. Factors are performance indicators that show performance or status measurements of a computer system. Systems, methods, and/or techniques, in some embodiment, analyze time series data based on historical data by using multi-head transformer that employs self-attention and cross attention. Systems, methods, and/or techniques, in some embodiment, train the multi-head transformer model to generate one or more values in the future time. Systems, methods, and/or techniques, in some embodiment, predict possibilities of system problems using a classification model for a current system. Systems, methods, and/or techniques, in some embodiment, calculate a weight of the current system and get an adjusted weight within one specific model for one specific factor by cross system comparison. Systems, methods, and/or techniques, in some embodiment, based on the factor weight ranking order, select factor candidates from a relatively high-accuracy system and update candidate factors for a relatively low-accuracy system. Systems, methods, and/or techniques, in some embodiment, iterate the train, predict and adjust steps to improve prediction accuracies of the classification models.

Figure 2:
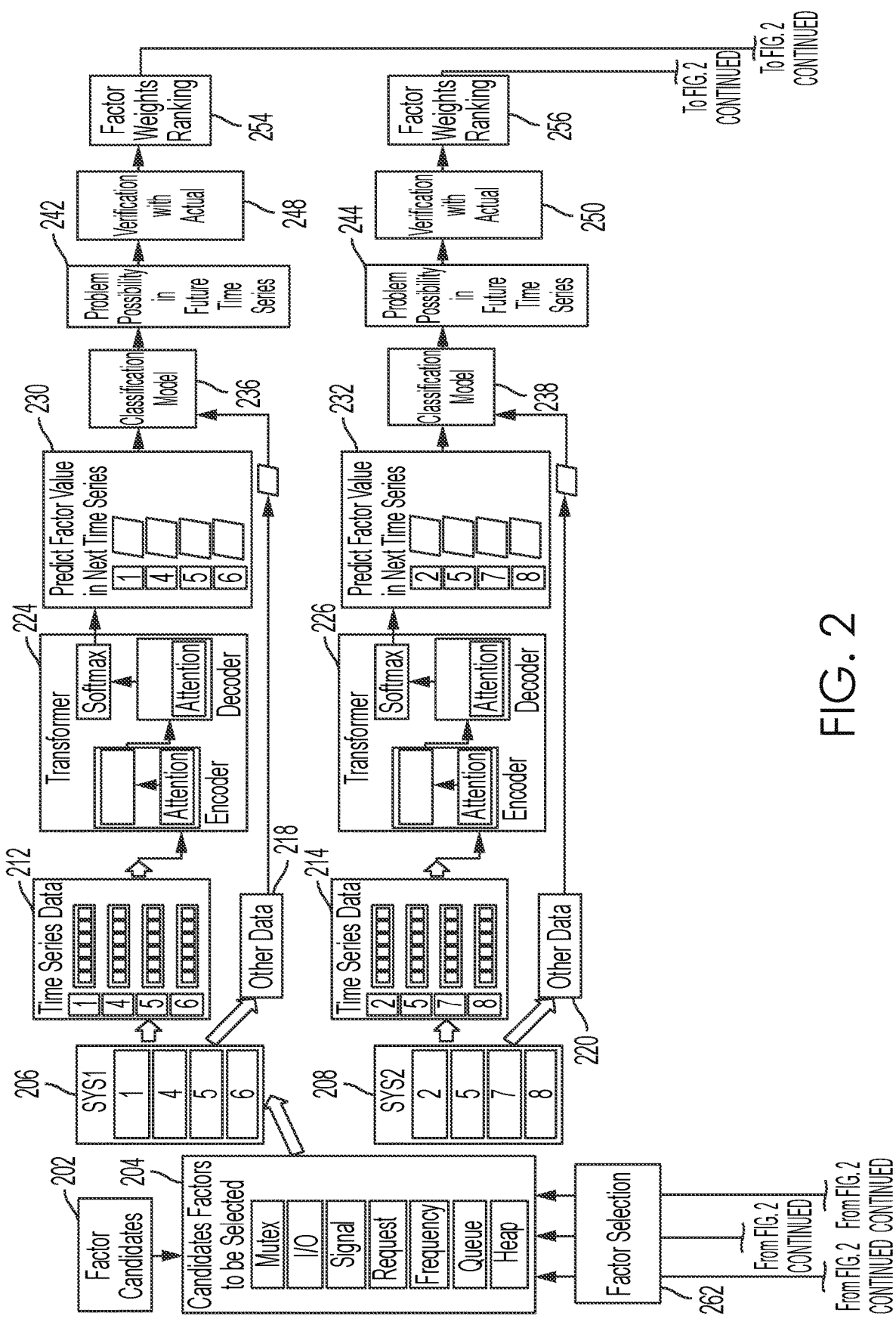
FIG. 2 is a diagram illustrating architecture of providing preemptive alert in one or more computer systems some embodiments.
Figure 2:
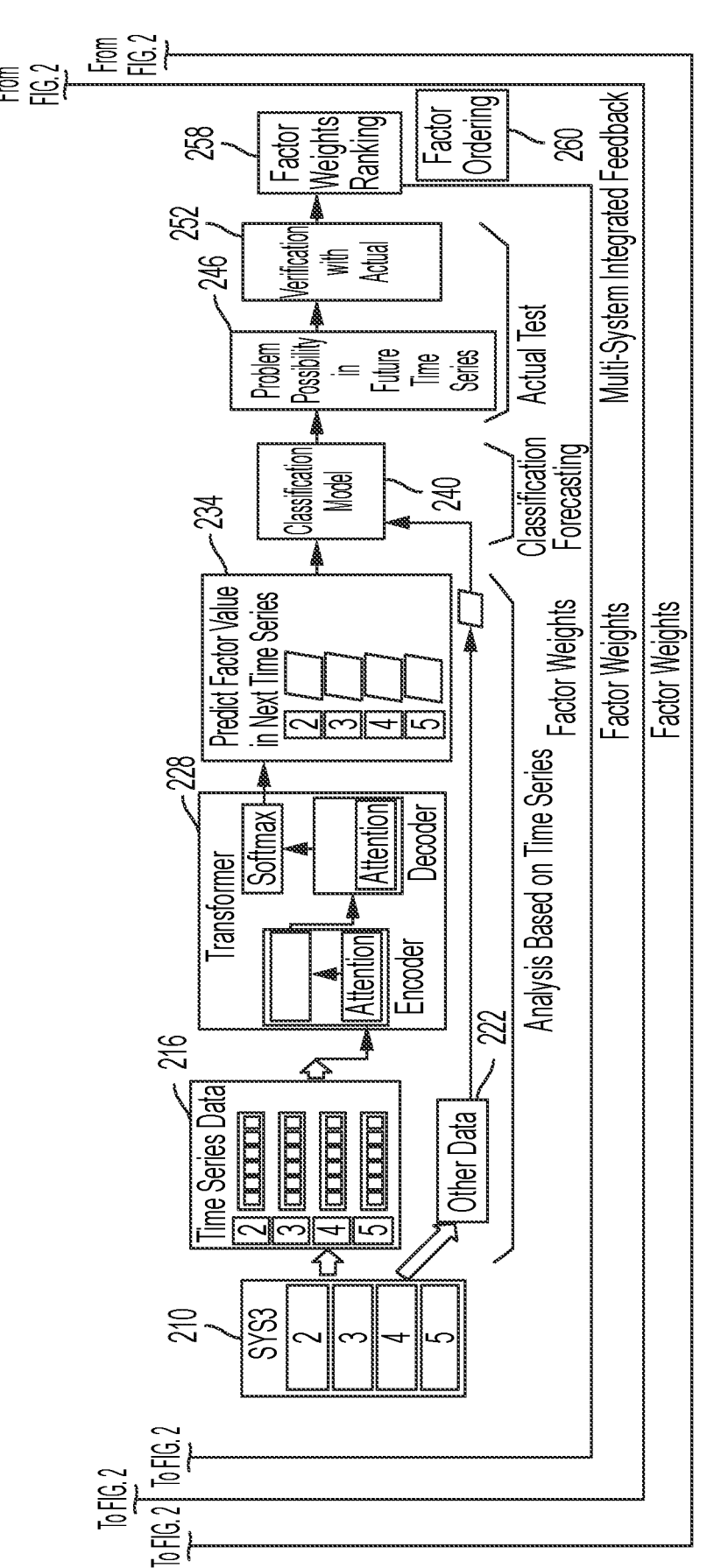

FIG. 2 is a diagram illustrating architecture of providing preemptive alert in one or more computer systems some embodiments. The components shown are computer-implemented components. During initialization, from various factors 202 (shown as factor candidates), candidate factors are selected as shown at 204 for a system in a computing environment such as a distributed computer system environment. Selection at 204 can be done in random manner. For instance, candidate factors can be selected randomly from a pool of fact candidates 202. Selection can be done for each of multiple computer systems, e.g., 206, 208, 210, in a computing environment. Selected candidate factors can include factors that have time series data 212, 214, 216 and static factors that have static data 218, 220, 222. Candidate factor with time series data has values that change over time. Candidate factor with static data has values that remain the same over time. In an aspect, different factors or set of factors can be selected for each system 204, 206, 210, e.g., as it may be expensive for one single system to collect all performance factors.

Factors are performance or operational indicators of a computer system. Factors from one or more performance or operational categories can be selected as candidates. For instance, factors in mutex (mutual exclusion) wait queue category may include semaphore, lock, condition variable, spinlock, barrier, and/or others. Factors in input/output (I/O) category may include file I/O, socket I/O, network I/O, Disk I/O, and/or keyboard I/O. Factors in malloc number category may include heap allocation, memory management, dynamic memory allocation, memory fragmentation, and/or memory leak. Factors in network connection category may include Transmission Control Protocol (TCP) connection, user datagram protocol (UDP) connection, socket connection, network protocol, and/or bandwidth. Factors in signal category may include interrupt signal, signal handler, signal mask, signal delivery and/or signal propagation. Factors in critical section length category may include mutual exclusion, synchronization, deadlock thread synchronization, and/or concurrency control. Factors in workload request frequency category may include request rate, throughput, response time, latency, and/or queue length. Factors in central processing unit (CPU) category may include processor, core, multithreading, instruction set, and/or cache hierarchy. Factors in memory category may include random memory access (RAM), virtual memory, page fault, memory hierarchy, and/or memory management unit (MMU). Factors in application trace category may include debugging, system hardware/software profiling, logging, performance monitoring, and/or tracing tools. Other factors or other categories of factors can be selected as candidate factors.

The factors that have time series data are passed through a transformer that predicts next data in the time series. Transformers 224, 226, 228 are trained using historical time series data to predict future values in the time series. For instance, considering sys1 (a system) at 206, time series data 212 associated with its candidate factors are input to transformer 224. Transformer has encoder-decoder architecture. In some embodiments, multi-head self-attention and cross attention can be used as an encoder in training for multiple types of time series data. For example, mutex wait queue, workload request frequency, critical section length are different types of time series data. For instance, the mutex wait queue in the next time will be effected by multiple time series data. Transformer 224 predicts factor values for next time step or unit in the time series as shown at 230.

Figure 3:
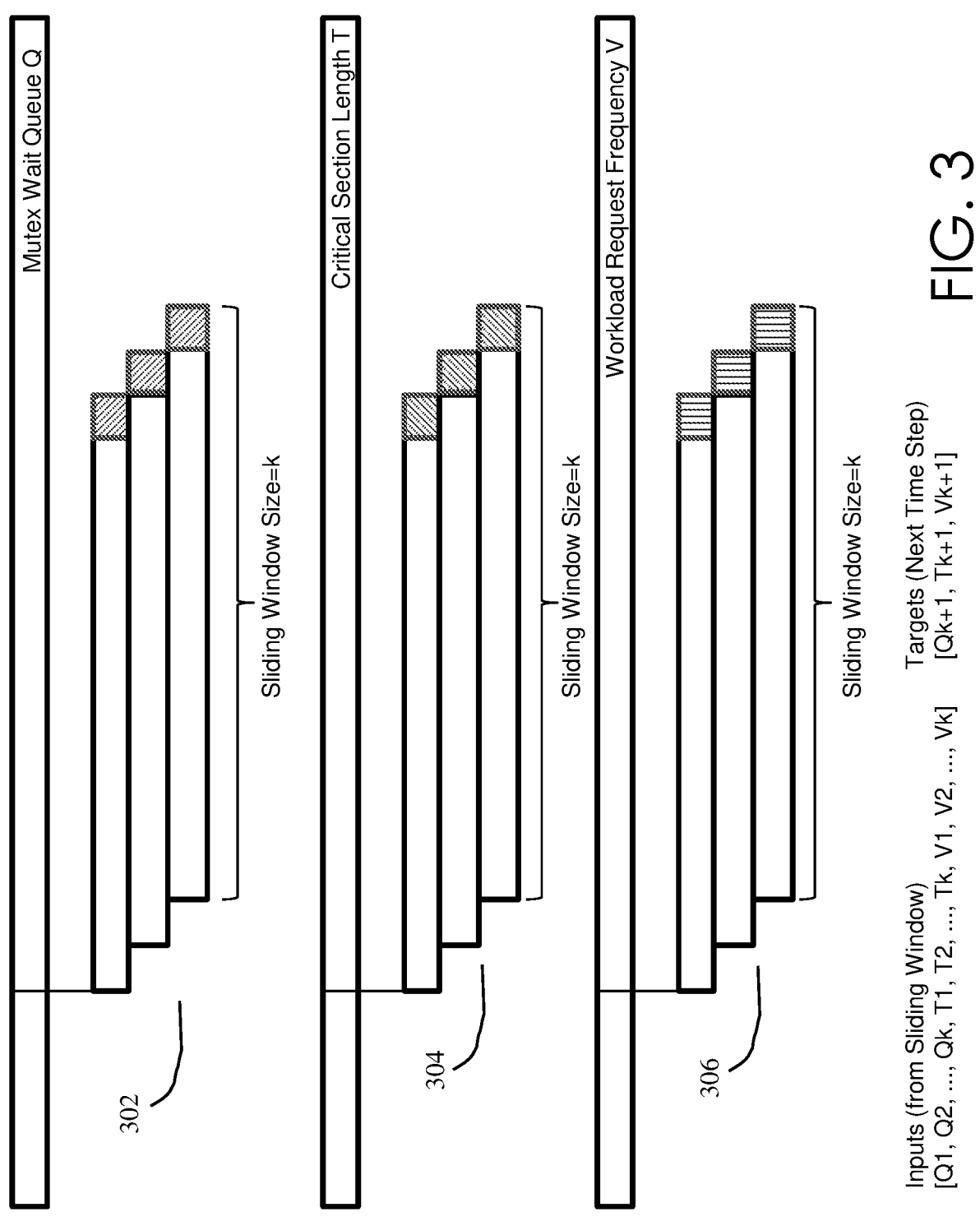
FIG. 3 shows an example of time series data associated with example candidate factors in some embodiments.

FIG. 3 shows an example of time series data associated with example candidate factors in some embodiments. Sliding windows of size k, where k can be predefined or preconfigured, time series data 302, 304, 306, for each of candidate factor time series data are used as input to transformer (e.g., FIG. 2, 224) to train the transformer to be able to predict future time values. Once trained, transformer (e.g., FIG. 2, 224) takes inputs, which include time series data of a window of size k, e.g., [Q1, Q2 . . . , Qk, T1, T2, . . . , Tk, V1, V2, . . . , Vk], where, by example, Q1, Q2, . . . . Qk is times series data associated with candidate factor such as mutex wait queue, T1, T2 . . . . Tk is times series data associated with candidate factor such as critical section length, and V1, V2, . . . . Vk is times series data associated with candidate factor such as workload request frequency. Given those inputs, transformer (e.g., FIG. 2, 224) predicts next values in the time series data, Qk+1, Tk+1, Vk+1, where k+1 is a next time step or unit.

Figure 4:
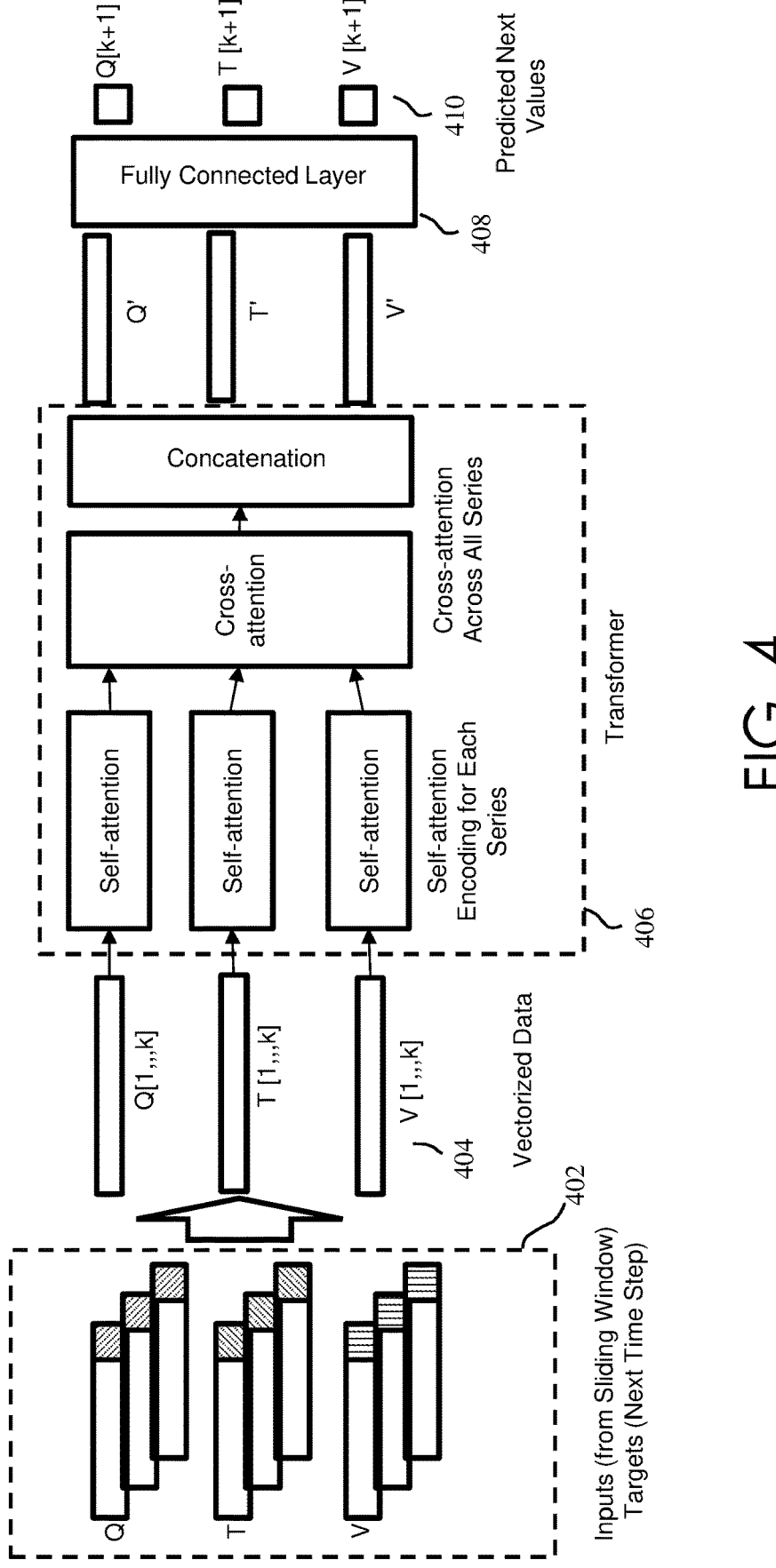
FIG. 4 shows transformer architecture in some embodiments.

FIG. 4 shows transformer architecture in some embodiments, for example, shown in FIG. 2 at 224. Transformer 406 is trained based on vectors 404 or vectorized values of inputs 402, sets of sliding windows of size k, where k is configurable or pre-defined. Transformer 406 uses self-attention encoding for each candidate factor time series, then cross attention across all series. The encoded time series data of different types are concatenated for inputting to fully connected layer 408. For example, input of transformer 406 are time series token sequences. For example, vectors Q. T. V 404 represent different types of time series data (shown as inputs 402). Each vector 404 is fed into self-attention. This self-attention mechanism captures the relationships between different tokens in the input sequence. In decoder of transformer 406, output vector Q', T'. V' is generated using cross-attention. For example, the decoder generates a target sequence one token at a time. To generate the next token, the decoder considers both the token it has generated so far and the relevant information from the input sequence. For example, the decoder generates next tokens Qk+1, Tk+1, Vk+1, at one time. Fully connected layer 408, e.g., softmax layer, outputs prediction of next values for each candidate factor time series 410.

Referring back to FIG. 2, static candidate factor data 218 and the predicted time series candidate factor values 230 are input to classification model 236 that predicts possible problems that might occur in the future time 242. For instance, a classification model is trained and used to predict possible system problems. Time series prediction data 230 and other data 218 are used as input to classification model 236. Classification model 236 outputs a problem possibility. In some embodiments, input data is prep-processed to make sure the distributions (e.g., time distribution or frequency) of different data are uniform. Classification model 236 is trained with tagged training data to make the model stable. For instance, a model is considered stable if its prediction is within a threshold value of actual value (e.g., ground truth data). Once the model is considered as being stable, weight (W) within one specific model for one specific factor is determined. The factor weights describe or indicate the importance of a feature in classification model 236, for example, which features have the most impact on the model's predictions or the degree of importance of a feature in classification model's predictions. Known techniques can be used to identify or determine such weights. For example, existing software development tool libraries provide built-in methods to compute feature importance scores directly from a trained mode such as a trained decision tree.

Figure 5:
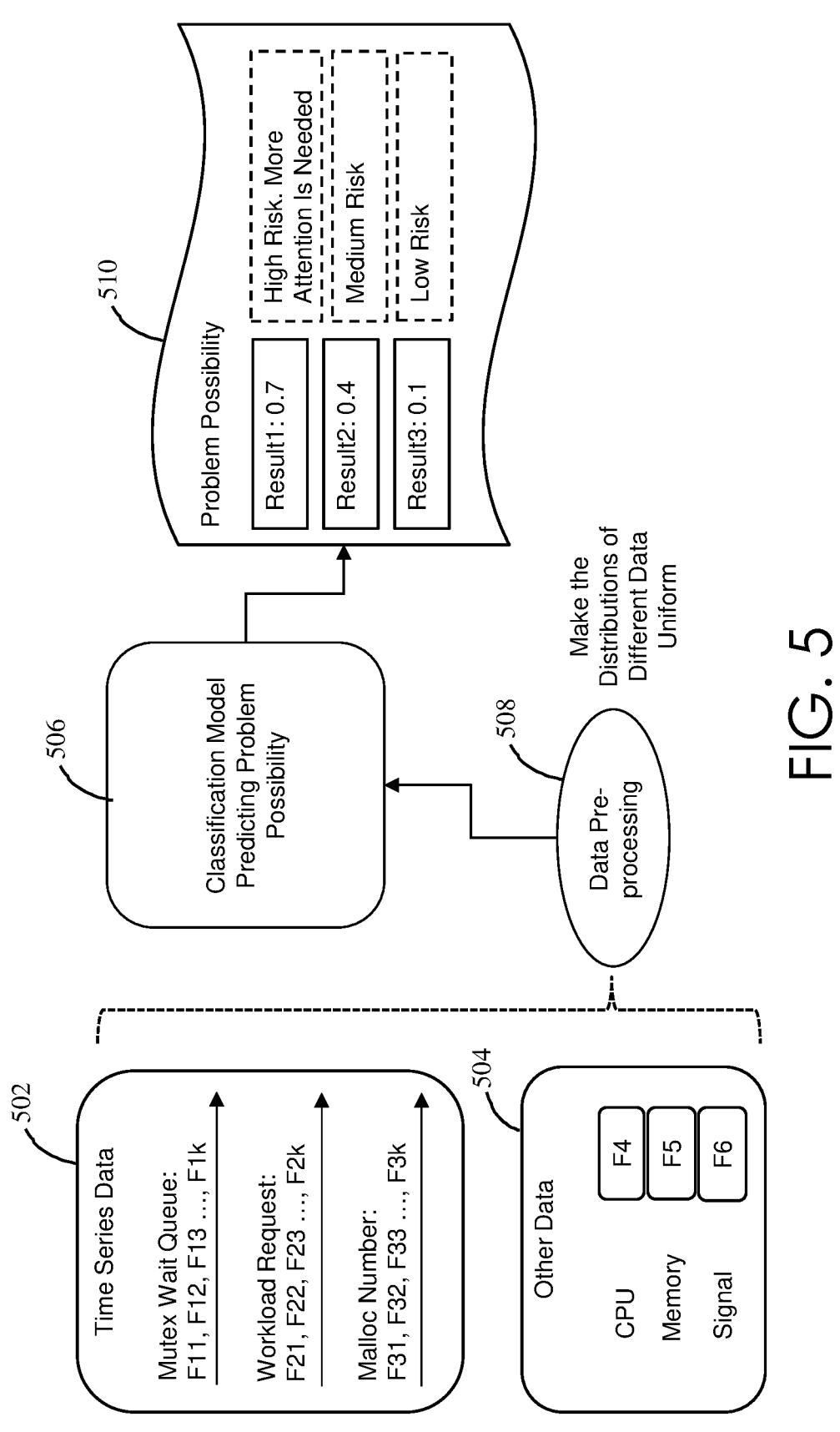
FIG. 5 is a diagram illustrating classification model in some embodiments.

FIG. 5 is a diagram illustrating classification model in some embodiments, e.g., shown at 236 in FIG. 2. Time series prediction data 502 (e.g., mutex wait queue, workload request, malloc number) and other data 504 (e.g., CPU, memory, signal) are used as input to classification model 506. Classification model 506 outputs a problem possibility. Example results are shown at 510. For instance, different inference runs of classification model 506 with different input data may provide different results. Based on the predicted future values of time series data and other data (e.g., static data), classification model 506 outputs a score or probability of occurrence of a problem in a given computer system having the conditions described or indicated by the input data. For instance, a result can show that there can be 70% possibility of a problem, and so forth. In some embodiments, input data is prep-processed 508 to make sure the distributions (e.g., time distribution or frequency) of different data are uniform. Classification model 506 is trained with tagged training data to make the model stable. For instance, a model is considered stable if its prediction is within a threshold value of actual value (e.g., ground truth data). Examples of classification model 506 include decision tree model, random forest model, and/or others.

Referring back to FIG. 2, problem possibility in the future time 242 predicted by classification model 236 is verified with actual known data, e.g., ground truth data, as shown at 248. For example, the actual or ground truth data can be obtained at that future time, and compared to the predicted problem possibility. At 254, factor weights are evaluated and ranked, for example, as described with reference to FIG. 6 at 626, 632 and 638.

Similar process flow is performed for other computer systems, for example, sys2 at 208 and sys3 at 210. For example, candidate factors are selected for system 208. Time series data 214 associated with the candidate factors are passed through transformer 226 that is trained on historic time series data associated with those candidate factors, for the transformer 226 to predict future values (e.g., values for next time step or unit in the time series) 232, e.g., as described with reference to FIG. 4. Static candidate factor data 220 and the predicted time series candidate factor values 232 are input to a classification model 238 that predicts problem possibility 244, e.g., as described with reference to FIG. 5. Problem possibility in the future time 244 predicted by classification model 238 is verified with actual known data, e.g., ground truth data, as shown at 250. For example, the actual or ground truth data can be obtained at that future time, and compared to the predicted problem possibility. At 256, factor weights are evaluated and ranked, for example, as described with reference to FIG. 6 at 628, 634 and 638.

Likewise, candidate factors are selected for system 210. Time series data 216 associated with the candidate factors are passed through transformer 228 that is trained on historic time series data associated with those candidate factors, for the transformer 228 to predict future values (e.g., values for next time step or unit in the time series) 234, e.g., as described with reference to FIG. 4. Static candidate factor data 222 and the predicted time series candidate factor values 234 are input to a classification model 240 that predicts problem possibility 246, e.g., as described with reference to FIG. 5. Problem possibility in the future time 246 predicted by classification model 240 is verified with actual known data, e.g., ground truth data, as shown at 252. For example, the actual or ground truth data can be obtained at that future time, and compared to the predicted problem possibility. At 258, factor weights are evaluated and ranked, for example, as described with reference to FIG. 6 at 630, 636, 638.

Figure 6:
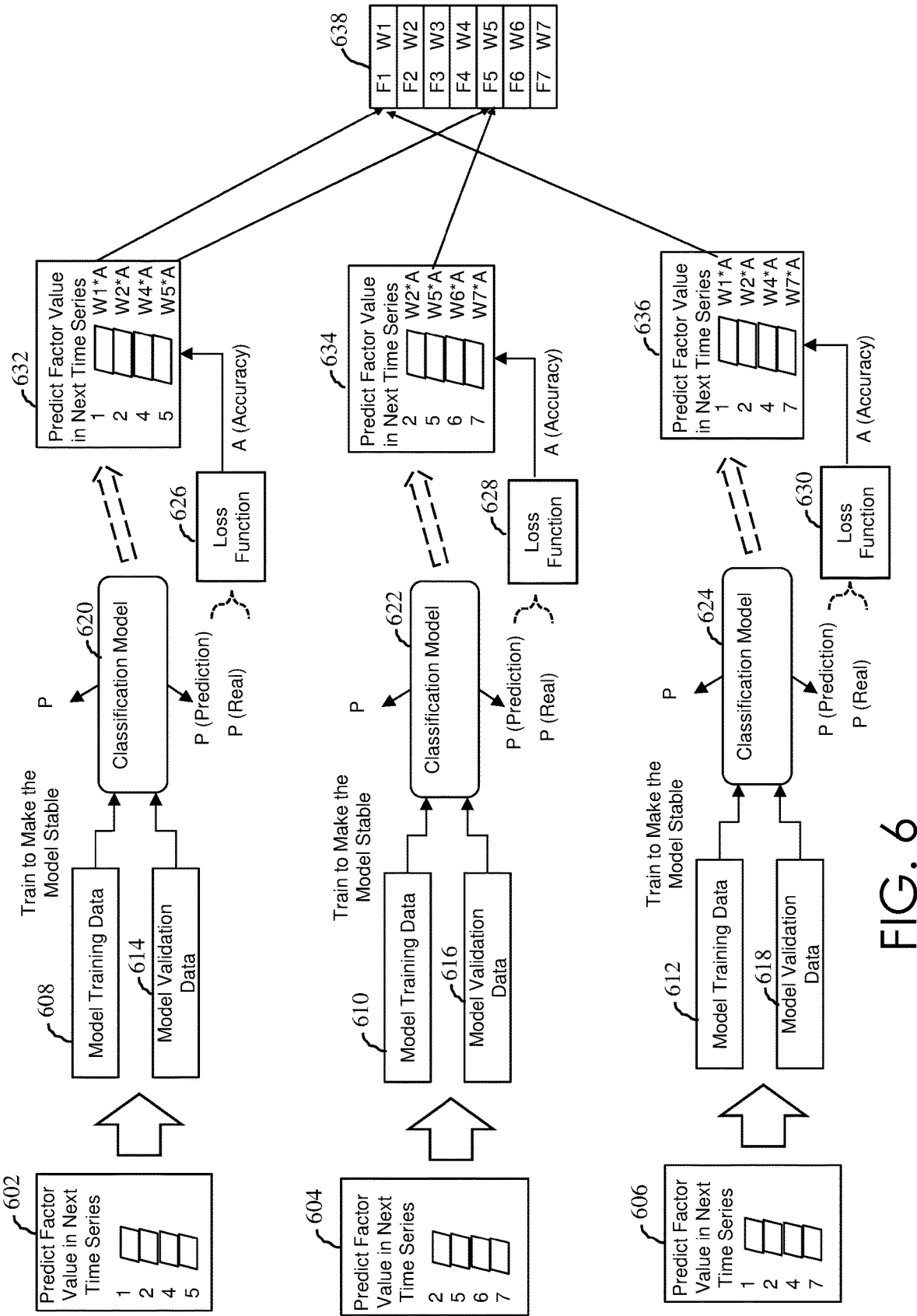
FIG. 6 illustrates evaluating factor weights using classification model in some embodiments.

FIG. 6 illustrates evaluating factor weights using classification model in some embodiments, e.g., shown at 254 in FIG. 2. Time series data of candidate factors 602 can be used. For instance, for training, candidate factors can be partitioned into model training data 608 and model validation data 614. Model training data 608 can be used to train classification model 620, e.g., also described with reference to FIG. 5. Model validation data 614 is used to predict the problem possibility value. For instance, model validation data 614 is input to classification model 620, and classification model 620 is run for inference. Classification model 620 outputs its prediction of problem possibility. The prediction problem possibility value and the real problem possibility (actual or ground truth value) are used as input to a loss function 626 to calculate the accuracy (A) of the classification model 620. Also, weight (W) of a candidate factor in this classification model 620 is obtained. W and A are multiplied to get an adjusted weight within one specific model for one specific factor as shown at 632.

Similar processing is performed for other systems. For instance, for another computer system, time series data of candidate factors 604, selected for that computer system, can be used. For instance, for training, candidate factors can be partitioned into model training data 610 and model validation data 616. Model training data 610 is used to train classification model 622, e.g., also described with reference to FIG. 5. Model validation data 616 is used to predict the problem possibility value. For instance, model validation data 616 is input to classification model 622, and classification model 620 is run for inference. Classification model 622 outputs its prediction of problem possibility. The prediction problem possibility value and the real problem possibility (actual or ground truth value) are used as input to a loss function 628 to calculate the accuracy (A) of the classification model 622. Also, weight (W) of a candidate factor in this classification model 622 is obtained. W and A are multiplied to get an adjusted weight within one specific model for one specific factor as shown at 634.

Likewise, for yet another computer system, time series data of candidate factors 606, selected for that computer system, can be used. For instance, for training, candidate factors can be partitioned into model training data 612 and model validation data 618. Model training data 612 is used to train classification model 624, e.g., also described with reference to FIG. 5. Model validation data 618 is used to predict the problem possibility value. For instance, model validation data 618 is input to classification model 624, and classification model 624 is run for inference. Classification model 624 outputs its prediction of problem possibility. The prediction problem possibility value and the real problem possibility (actual or ground truth value) are used as input to a loss function 630 to calculate the accuracy (A) of the classification model 620. Also, weight (W) of a candidate factor in this classification model 624 is obtained. W and A are multiplied to get an adjusted weight within one specific model for one specific factor as shown at 636.

The adjusted weights from all models 632, 634, 636, in which the specific factor is included as an input factor, are integrated to obtain the final weight of this factor 638. Integration, for example, can be taking a weighted average. For example, shown at 638, F1, . . . , F7 represent the candidate factors, W1, . . . , W7 represent weights of the candidate factors F1, . . . , F7. For example, W1, . . . , W7 shown at 638 are weighted average of W1, . . . , W7 shown at 632, 634 and 636. By way of example, if 3 systems (system1, system2, system3) have factor F1 then, W1 that is integrated can be, W1=(system1's W1*system1's accuracy A+system2's W1*system2's accuracy A+system3's W1*system3's accuracy A)/3, where '*' symbols represents multiplication, '+' symbol represents addition, and '/' symbol represents division.

Referring back to FIG. 2, at 260, factors are ordered according to their adjusted weights. For example, a unified factor ordering across all systems, based on the integrated values (e.g., weighted average values) of candidate factor weights (e.g., shown at FIG. 6, 638) is performed.

The factor weights and/or factor weight rankings from each system, e.g., 254, 256 and 258, are used to update factor selection at 262. For instance, one or more classification models 236 238 and 240, which may have low accuracy in their problem possibility prediction or classification, can be remodeled using different candidate factors. These different candidate factors can be selected based on the factor weights determined at 254, 256, 258. Whether a classification model has low accuracy can be determined based on the classification meeting a threshold accuracy, which may be predefined.

Figure 7:
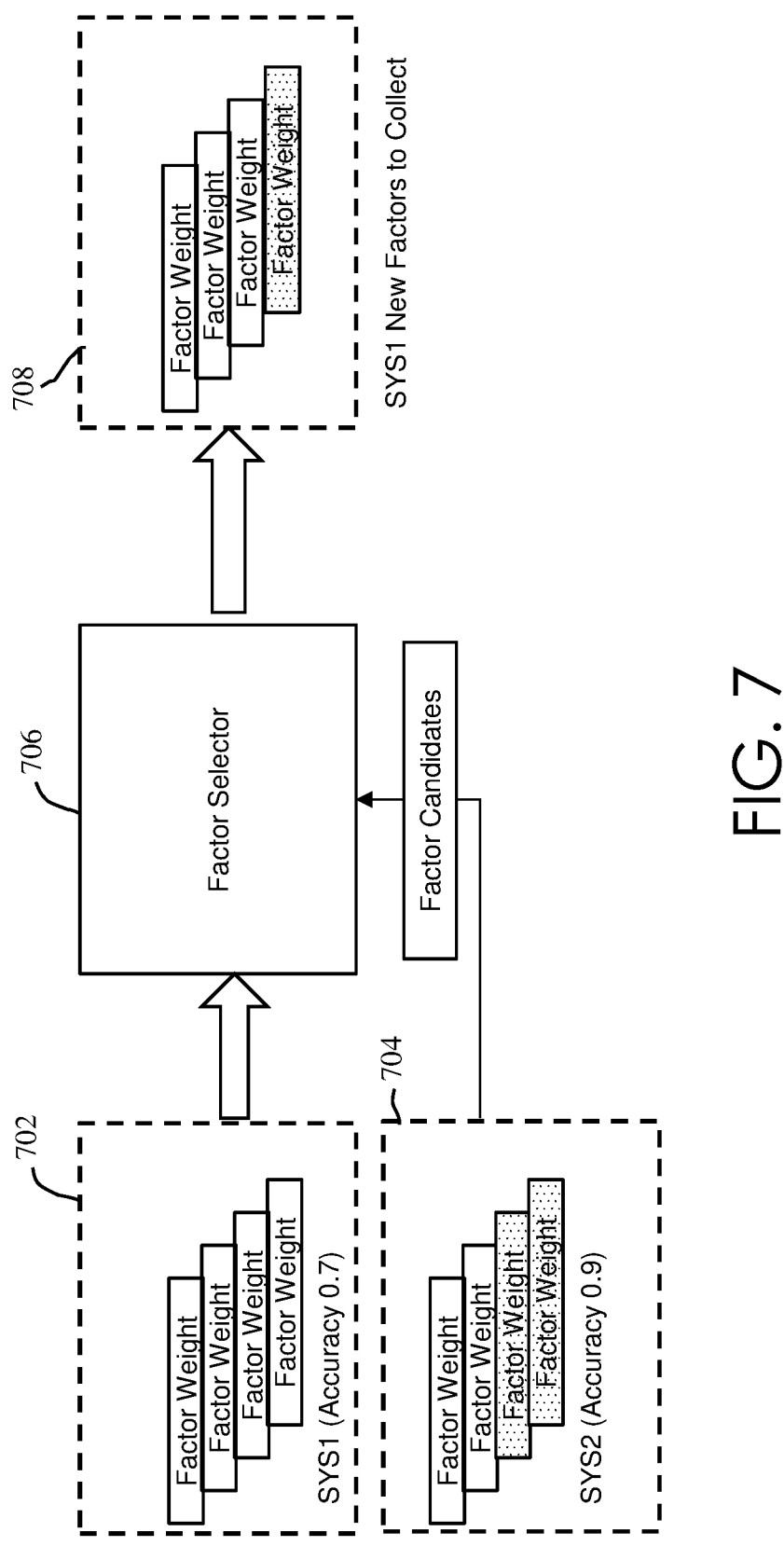
FIG. 7 shows updating factor candidates used in building a classification model in some embodiments.

FIG. 7 shows updating factor candidates used in building a classification model in some embodiments. For example, for a system having a classification model with low accuracy (e.g., as determined based on a threshold accuracy criterion), that classification model can be retrained using different or updated candidate factors. In some embodiments, one or more new factor candidates can be selected from a system with higher accuracy model, e.g., based on factor weight ranking order (e.g., shown in FIG. 2 at 260). Consider that system1 at 702 has accuracy of 0.7, which by predefined criterion is considered as being low. For example, a predefined criterion states that accuracy score or level that is less than 0.75 is low. Note that other predefined criterion for determining whether accuracy score or level is low. Consider also that system2 at 704 has higher accuracy score or level, e.g., 0.9. One or more new factor candidates for system1 702 are selected from system2 704. For example, a candidate factor with highest ranked weight in system2 704, which currently is also not used as a candidate factor in system1 702 can be selected by factor selector 706. The selected candidate factor replaces the factor with lowest weight in the low accuracy system, e.g., system1, as shown at 708. In some embodiments, more than one candidate factors can be replaced. For example, a predefined number of candidate factors can be replaced, or candidate factors that have weights meeting a criterion (e.g., less than a predefined threshold weight or relatively lower weight compared to others candidate factors) can be replaced.

Potential computer system problems can be detected early, for example, before they occur, for possible prevention or preventive measures to take place. Future severe system problem occurrence can be avoided by allowing for proper corresponding counter measures to potential issues. Potential computer system and/or application problem alerts can be generated timely. There can be savings in time and effort spent on root cause analysis after occurrence of a problem.

In some embodiments, methods described herein can be used directly as a solution or as a standalone tool used by a computer operating system, observability system, monitoring system, in both a real production environment and a development environment. The methods described herein can be used by all types of computer operating systems and runtime environments.

Figure 8:
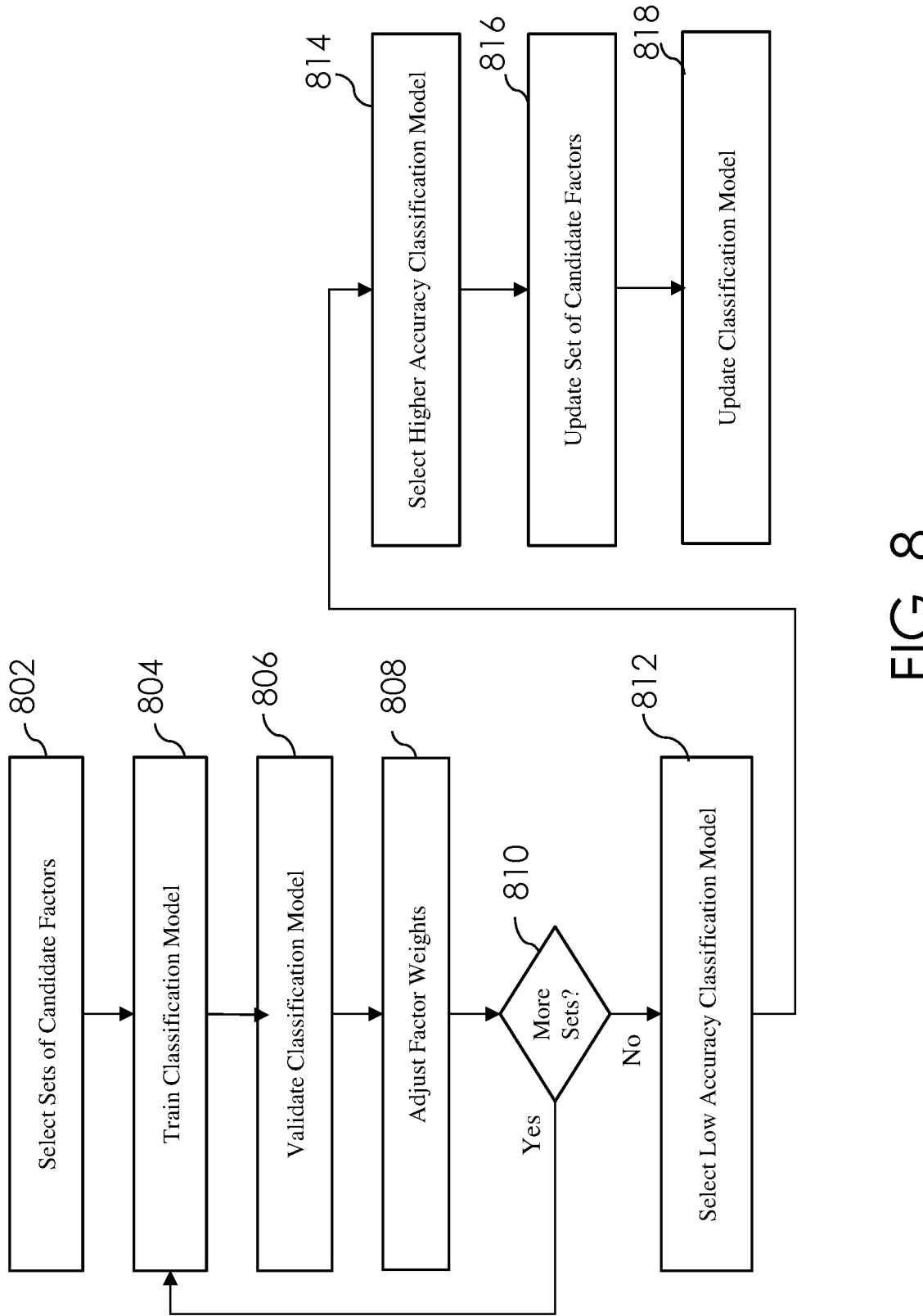
FIG. 8 is a flow diagram illustrating a method of prediction and predictive alert of potential computer system and/or application problems in some embodiments.

FIG. 8 is a flow diagram illustrating a method of prediction and predictive alert of potential computer system problems, e.g., operating system and/or application problems during runtime, in some embodiments. The method can be implemented and/or run on one or more computer processors. For instance, the method may predict computer system problems such as process or thread hangs, deadlocks and bottlenecks during runtime. The details of the method in various embodiments are also described with reference to FIGS. 2-7 above. At 802, a plurality of sets of candidate factors are selected. The candidate factors are indicators of computer performance. Examples of such factors are described above. Each set in the plurality of sets of candidate factors has a combination of candidate factors that is different from another set in the plurality of sets of candidate factors. In some embodiments, the candidate factors of a set can be selected randomly from a pool of computer system performance indicators.

For a set in the plurality of sets of candidate factors, processing at 804, 806 and 808 can be performed. This processing is also described with reference to FIG. 6. At 804, a classification model is trained to predict a problem possibility during a computer runtime using a training dataset associated with the set. At 806, the classification model is validated using a validation dataset associated with the set and an accuracy score associated with the classification model is determined. At 808, factor weights associated with the candidate factors in the set are adjusted based on the accuracy score. Examples of a classification model include, but are not limited to, decision tree, random forest, neural network, and/or others.

The training of the classification model, the validation of the classification model, and the adjusting of the factor weights are repeated for all sets in the plurality of sets of candidate factors, where a plurality of classification models is trained corresponding to the respective plurality of sets of candidate factors. For example, at 810, if there are more sets to process, the method proceeds to 804 and repeats the processing at 804, 806 and 808 for the next set of candidate factors. In some embodiments, the different sets of the plurality of sets of candidate factors can be associated with different computer systems in a distributed system.

At 812, from the plurality of classification models, a low accuracy classification model having an accuracy score lower than a threshold criterion is selected. The threshold criterion can be an absolute number such as 0.7 out of a score range, e.g., 0-10. As another example, the threshold criterion can be a relative number, such as 50% lower than the highest score in the score range (e.g., 0 to 10). Another threshold criterion can be used or defined.

At 814, from the plurality of classification models, a higher accuracy classification model having an accuracy score that is higher than the accuracy score of the low accuracy classification model is selected. In some embodiments, a higher accuracy classification model is selected that has the highest accuracy score among the plurality of classification models.

At 816, the set of candidate factors used to train the low accuracy classification model is updated by replacing at least one candidate factor in the set of candidate factors used to train the low accuracy classification model with a candidate factor in the set of candidate factors used to train the higher accuracy classification model. At 818, the low accuracy classification model is updated by repeating the training of the classification model, the validating of the classification model, and the adjusting of the factor weights, using the updated set of candidate factors.

The method in some embodiments may be able to identify problems in distributed and/or multi-cloud environments, even when symptoms are buried in floods of irrelevant data, huge volume, velocity, and overwhelming variety of data. The method in some embodiments may be able to prevent in advance, potential underlying issues, which may lead to high-level symptoms. In some embodiments, the method can automatically provide preemptive alert of computer system and/or application problems during runtime.

In some embodiments, the method also includes, for the set in the plurality of sets of candidate factors, training a transformer with encoder and decoder architecture to generate future values for at least some of the candidate factors in the set, for example, as described with reference to FIG. 4, and also FIG. 2. The training of the transformer is repeated along with repeating of the training of the classification model, the validation of the classification model, and the adjusting of the factor weights, for all sets in the plurality of sets of candidate factors, where a plurality of transformers are trained corresponding to the respective plurality of sets of candidate factors. The updating of the low accuracy classification model includes updating the low accuracy classification model by repeating the training of the transformer, the training of the classification model, the validating of the classification model, and the adjusting of the factor weights, using the updated set of candidate factors.

In some embodiments, the method further include passing a new set of feature values corresponding to the updated set of candidate factors to the transformer trained using the updated set of candidate factor to generate future values corresponding to the updated set of candidate factors, and using the generated future values as input to the updated low accuracy classification model to predict a future problem possibility.

In some embodiments, the method further includes repeating the selecting of the low accuracy classification model, the selecting of the higher accuracy classification model, the updating of the set of candidate factors used to train the low accuracy classification model, and the updating of the low accuracy classification model, until all low accuracy classification models in the plurality of classification models are updated. In this way, for example, all classification models can be improved, for example, to have an accuracy score above a threshold criterion.

In some embodiments, the candidate factors include factors having time series data values that change during a period of time and at least one factor having a data value that remains static during the period of time. In this way, the classification model can handle various types of factors, e.g., including time series data as well as static data.

In some embodiments, the transformer is a multi-head transformer with self-attention and cross attention, where the transformer generates the future values based on self-attention of individual time series data of multiple time series data input to the transformer and cross-attention among the multiple time series data. In this way, for example, more accurate future values may be generated based on self-attention as well as cross-attention across the candidate factors in a set. For instance, dependencies among candidate factors can be taken into account when generating future values of the individual candidate factors.

In some embodiments, the replacing of the at least one candidate factor in the set of candidate factors used to train the low accuracy classification model includes replacing the at least one candidate factor that has a lowest adjusted factor weight selected from the set of candidate factors used to train the low accuracy classification model, with the candidate factor that has a highest adjusted factor weight and that is not also in the set of candidate factors used to train the low accuracy classification model selected from the set of candidate factors used to train the higher accuracy classification. In this way, for example, one or more candidate factors that may contribute least to a classification model's decision-making can be replaced with one or more candidate factors that may contribute more to the classification model's decision-making.

In some embodiments, the adjusting of the factor weights includes adjusting factor weights of the candidate factors in the set used in the classification model by multiplying the accuracy score with the factor weights of the candidate factors. In this way, the weights of the individual candidate factors used in a classification model can be adjusted also based on the overall performance accuracy of the classification model.

In some embodiments, a computer-implemented method includes selecting a plurality of sets of candidate factors. The candidate factors are indicators of computer performance. Each set in the plurality of sets of candidate factors has a combination of candidate factors that is different from another set in the plurality of sets of candidate factors. For example, the candidate factors of a set can be selected randomly from a pool of computer system performance indicators. For a set in the plurality of sets of candidate factors, the following can be performed: training a transformer with encoder and decoder architecture to generate future values for at least some of the candidate factors in the set, training a classification model to predict a problem possibility during a computer runtime using a training dataset associated with the set, validating the classification model using a validation dataset associated with the set and determining an accuracy score associated with the classification model, and adjusting factor weights associated with the candidate factors in the set based on the accuracy score. The training of the transformer, the training of the classification model, the validation of the classification model, and the adjusting of the factor weights are repeated for all sets in the plurality of sets of candidate factors. Hence, a plurality of transformers and a plurality of classification models are trained corresponding to the respective plurality of sets of candidate factors.

The method also includes selecting from the plurality of classification models a low accuracy classification model having an accuracy score lower than a threshold criterion. The threshold criterion can be an absolute number such as 0.7 out of a score range, e.g., 0-10. As another example, the threshold criterion can be a relative number, such as 50% lower than the highest score in the score range (e.g., 0 to 10). Another threshold criterion can be used or defined.

The method also includes selecting from the plurality of classification models a higher accuracy classification model having an accuracy score that is higher than the accuracy score of the low accuracy classification model. In some embodiments, a classification model with highest accuracy score can be selected.

The method also includes updating the set of candidate factors used to train the low accuracy classification model by replacing at least one candidate factor in the set of candidate factors used to train the low accuracy classification model with a candidate factor in the set of candidate factors used to train the higher accuracy classification model.

The method also include updating the low accuracy classification model by repeating the training of the transformer, the training of the classification model, the validating of the classification model, and the adjusting of the factor weights, using the updated set of candidate factors.

A computer program product including a computer readable storage medium having program instructions embodied therewith, the program instructions readable by a device to cause the device to perform one or more of the methods described herein can be provided. A system including at least one computer processor and at least one memory device coupled with the computer processor, where the at least one computer processor is configured to perform one or more of the methods described herein can be provided.

Figure 9:
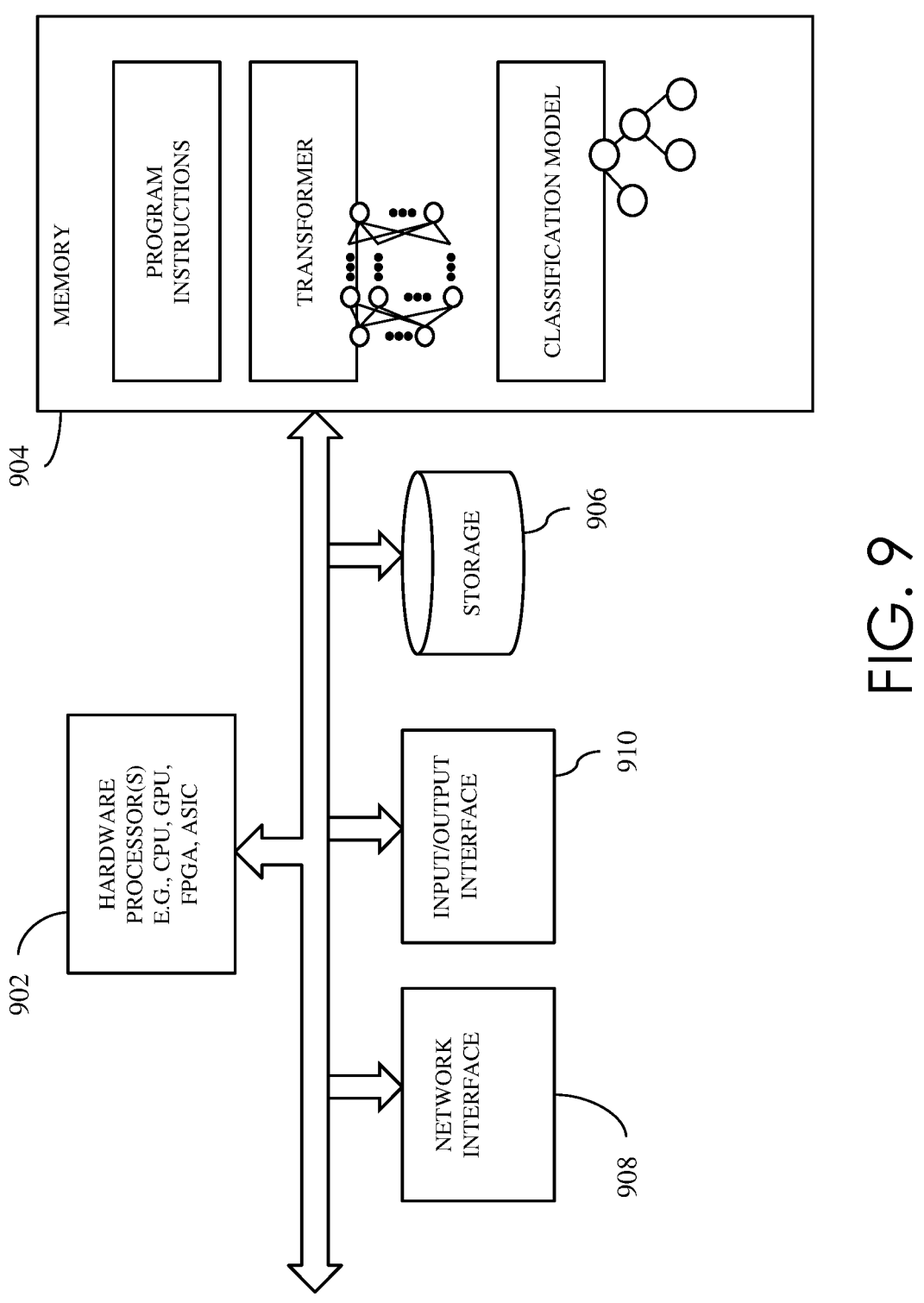
FIG. 9 is a diagram showing components of a system in some embodiments that can provide preemptive alert of system and/or application problem during runtime.

FIG. 9 is a diagram showing components of a system in some embodiments that can provide preemptive alert of system and/or application problem during runtime. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904. A memory device 904 may include random access memory (RAM), read-only memory (ROM) or another memory device, and may store data and/or processor instructions for implementing various functionalities associated with the methods and/or systems described herein. One or more processors 902 may execute computer instructions stored in memory 904 or received from another computer device or medium. A memory device 904 may, for example, store instructions and/or data for functioning of one or more hardware processors 902, and may include an operating system and other program of instructions and/or data. One or more hardware processors 902 may select a plurality of sets of candidate factors. For a set of candidate factors in the plurality of sets of candidate factors, one or more hardware processors 902 may train a classification model to predict a problem possibility during a computer runtime using a training dataset associated with the set, validate the classification model using a validation dataset associated with the set and determining an accuracy score associated with the classification model, and adjust factor weights associated with the candidate factors in the set based on the accuracy score. One or more hardware processors 902 may repeat training of the classification model, validation of the classification model, and adjusting of the factor weights are repeated for all sets in the plurality of sets of candidate factors. In this way, a plurality of classification models is trained corresponding to the respective plurality of sets of candidate factors. One or more hardware processors 902 may select from the plurality of classification models a low accuracy classification model having an accuracy score lower than a threshold criterion. One or more hardware processors 902 may select from the plurality of classification models a higher accuracy classification model having an accuracy score that is higher than the accuracy score of the low accuracy classification model. One or more hardware processors 902 may update the set of candidate factors used to train the low accuracy classification model by replacing at least one candidate factor in the set of candidate factors used to train the low accuracy classification model with a candidate factor in the set of candidate factors used to train the higher accuracy classification model. One or more hardware processors 902 may update the low accuracy classification model by repeating the training of the classification model, the validating of the classification model, and the adjusting of the factor weights, using the updated set of candidate factors. In one aspect, candidate factor data such as training data, validation data may be stored in a storage device 906 or received via a network interface 908 from a remote device, and may be temporarily loaded into a memory device 904 for generating the classification models. The learned classification models may be stored on a memory device 904, for example, for running by one or more hardware processors 902. One or more hardware processors 902 may be coupled with interface devices such as a network interface 908 for communicating with remote systems, for example, via a network, and an input/output interface 910 for communicating with input and/or output devices such as a keyboard, mouse, display, and/or others.

Systems and methods in some embodiments may be able to identify problems in distributed and/or multi-cloud environments, even when symptoms are buried in floods of irrelevant data, huge volume, velocity and overwhelming variety of data. Systems and methods in some embodiments may be able to prevent in advance, potential underlying issues, which may lead to high-level symptoms. For example, in some embodiments, systems and methods can automatically provide preemptive alert of computer system and/or application problems during runtime.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having." when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" or "in some embodiments" does not necessarily refer to the same embodiment, although they may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   selecting a plurality of sets of candidate factors, the candidate factors being indicators of computer performance, and wherein each set in the plurality of sets of candidate factors has a combination of candidate factors that is different from another set in the plurality of sets of candidate factors;
   for a set in the plurality of sets of candidate factors, training a classification model to predict a problem possibility during a computer runtime using a training dataset associated with the set,
   validating the classification model using a validation dataset associated with the set by running the classification model with the validation dataset passed to the classification model as input, the classification model predicting the problem possibility as output, and determining based on the output an accuracy score associated with the classification model, and
   adjusting factor weights associated with the candidate factors in the set based on the accuracy score,
   wherein the training of the classification model, the validation of the classification model, and the adjusting of the factor weights are repeated for all sets in the plurality of sets of candidate factors, wherein a plurality of classification models is trained corresponding to the respective plurality of sets of candidate factors;
   selecting from the plurality of classification models a low accuracy classification model having an accuracy score lower than a threshold criterion;
   selecting from the plurality of classification models a higher accuracy classification model having an accuracy score that is higher than the accuracy score of the low accuracy classification model;
   updating the set of candidate factors used to train the low accuracy classification model by replacing at least one candidate factor in the set of candidate factors used to train the low accuracy classification model with a candidate factor in the set of candidate factors used to train the higher accuracy classification model;
   updating the low accuracy classification model by repeating the training of the classification model, the validating of the classification model, and the adjusting of the factor weights, using the updated set of candidate factors,
   the updating of the low accuracy classification model improving performance accuracy of the low accuracy classification model; and
   running the updated low accuracy classification model to predict potential runtime computer operation problems, wherein responsive to the predicted potential runtime computer operation problems, an alert is generated to prevent the predicted potential runtime computer operation problems from occurring.

2. The computer-implemented method of claim 1, further including:
   for the set in the plurality of sets of candidate factors,
      training a transformer with encoder and decoder architecture to generate future values for at least some of the candidate factors in the set,
   wherein the training of the transformer is repeated along with repeating of the training of the classification model, the validation of the classification model, and the adjusting of the factor weights, for all sets in the plurality of sets of candidate factors, wherein a plurality of transformers are trained corresponding to the respective plurality of sets of candidate factors; and
   the updating of the low accuracy classification model includes updating the low accuracy classification model by repeating the training of the transformer, the training of the classification model, the validating of the classification model, and the adjusting of the factor weights, using the updated set of candidate factors.

3. The computer-implemented method of claim 2, further including passing a new set of feature values corresponding to the updated set of candidate factors to the transformer trained using the updated set of candidate factor to generate future values corresponding to the updated set of candidate factors, and using the generated future values as input to the updated low accuracy classification model to predict a future problem possibility.

4. The computer-implemented method of claim 2, further including repeating the selecting of the low accuracy classification model, the selecting of the higher accuracy classification model, the updating of the set of candidate factors used to train the low accuracy classification model, and the updating of the low accuracy classification model, until all low accuracy classification models in the plurality of classification models are updated.

5. The computer-implemented method of claim 2, wherein the candidate factors include factors having time series data values that change during a period of time and at least one factor having a data value that remains static during the period of time.

6. The computer-implemented method of claim 2, wherein the transformer is a multi-head transformer with self-attention and cross attention, wherein the transformer generates the future values based on self-attention of individual time series data of multiple time series data input to the transformer and cross-attention among the multiple time series data.

7. The computer-implemented method of claim 1, wherein the replacing of the at least one candidate factor in the set of candidate factors used to train the low accuracy classification model includes:

replacing the at least one candidate factor that has a lowest adjusted factor weight selected from the set of candidate factors used to train the low accuracy classification model, with the candidate factor that has a highest adjusted factor weight and that is not also in the set of candidate factors used to train the low accuracy classification model selected from the set of candidate factors used to train the higher accuracy classification.

8. The computer-implemented method of claim 1, wherein the adjusting of the factor weights includes adjusting factor weights of the candidate factors in the set used in the classification model by multiplying the accuracy score with the factor weights of the candidate factors.

9. A computer program product comprising a computer readable storage medium having program instructions embodied therewith, the program instructions readable by a device to cause the device to:

select a plurality of sets of candidate factors, the candidate factors being indicators of computer performance, and wherein each set in the plurality of sets of candidate factors has a combination of candidate factors that is different from another set in the plurality of sets of candidate factors;

for a set in the plurality of sets of candidate factors, train a classification model to predict a problem possibility during a computer runtime using a training dataset associated with the set, validate the classification model using a validation dataset associated with the set by running the classification model with the validation dataset passed to the classification model as input, the classification model predicting the problem possibility as output, and determine based on the output an accuracy score associated with the classification model, and adjust factor weights associated with the candidate factors in the set based on the accuracy score, wherein the device is caused to repeat the training of the classification model, the validation of the classification model, and the adjusting of the factor weights for all sets in the plurality of sets of candidate factors, wherein a plurality of classification models is trained corresponding to the respective plurality of sets of candidate factors;

select from the plurality of classification models a low accuracy classification model having an accuracy score lower than a threshold criterion;

select from the plurality of classification models a higher accuracy classification model having an accuracy score that is higher than the accuracy score of the low accuracy classification model;

update the set of candidate factors used to train the low accuracy classification model by replacing at least one candidate factor in the set of candidate factors used to train the low accuracy classification model with a candidate factor in the set of candidate factors used to train the higher accuracy classification model;

update the low accuracy classification model by repeating the training of the classification model, the validating of the classification model, and the adjusting of the factor weights, using the updated set of candidate factors, updating of the low accuracy classification model improving performance accuracy of the low accuracy classification model; and run the updated low accuracy classification model to predict potential runtime computer operation problems, wherein responsive to the predicted potential runtime computer operation problems, an alert is generated to prevent the predicted potential runtime computer operation problems from occurring.

10. The computer program product of claim 9, wherein the device is further caused to:

for the set in the plurality of sets of candidate factors, train a transformer with encoder and decoder architecture to generate future values for at least some of the candidate factors in the set, wherein the device is caused to repeat the training of the transformer along with repeating of the training of the classification model, the validation of the classification model, and the adjusting of the factor weights, for all sets in the plurality of sets of candidate factors, wherein a plurality of transformers are trained corresponding to the respective plurality of sets of candidate factors; and the device caused to update the low accuracy classification model includes the device caused to update the low accuracy classification model by repeating the training of the transformer, the training of the classification model, the validating of the classification model, and the adjusting of the factor weights, using the updated set of candidate factors.

11. The computer program product of claim 10, wherein the device is further caused to pass a new set of feature values corresponding to the updated set of candidate factors to the transformer trained using the updated set of candidate factor to generate future values corresponding to the updated set of candidate factors, and using the generated future values as input to the updated low accuracy classification model to predict a future problem possibility.

12. The computer program product of claim 10, wherein the device is further caused to repeat the selecting of the low accuracy classification model, the selecting of the higher accuracy classification model, the updating of the set of candidate factors used to train the low accuracy classification model, and the updating of the low accuracy classification model, until all low accuracy classification models in the plurality of classification models are updated.

13. The computer program product of claim 10, wherein the candidate factors include factors having time series data values that change during a period of time and at least one factor having a data value that remains static during the period of time.

14. The computer program product of claim 10, wherein the transformer is a multi-head transformer with self-attention and cross attention, wherein the transformer generates the future values based on self-attention of individual time series data of multiple time series data input to the transformer and cross-attention among the multiple time series data.

15. The computer program product of claim 9, wherein the device caused to replace of the at least one candidate factor in the set of candidate factors used to train the low accuracy classification model includes:

the device caused to replace the at least one candidate factor that has a lowest adjusted factor weight selected from the set of candidate factors used to train the low accuracy classification model, with the candidate factor that has a highest adjusted factor weight and that is not also in the set of candidate factors used to train the low accuracy classification model selected from the set of candidate factors used to train the higher accuracy classification.

16. The computer program product of claim 9, wherein the device caused to adjust the factor weights includes the device caused to adjust factor weights of the candidate factors in the set used in the classification model by multiplying the accuracy score with the factor weights of the candidate factors.

17. A system comprising:

at least one computer processor;

at least one memory device coupled with the computer processor;

the at least one computer processor configured to at least:

select a plurality of sets of candidate factors, the candidate factors being indicators of computer performance, and wherein each set in the plurality of sets of candidate factors has a combination of candidate factors that is different from another set in the plurality of sets of candidate factors;

for a set in the plurality of sets of candidate factors, train a classification model to predict a problem possibility during a computer runtime using a training dataset associated with the set, validate the classification model using a validation dataset associated with the set by running the classification model with the validation dataset passed to the classification model as input, the classification model predicting the problem possibility as output, and determine based on the output an accuracy score associated with the classification model, and adjust factor weights associated with the candidate factors in the set based on the accuracy score, wherein the computer processor is configured to repeat the training of the classification model, the validation of the classification model, and the adjusting of the factor weights for all sets in the plurality of sets of candidate factors, wherein a plurality of classification models is trained corresponding to the respective plurality of sets of candidate factors;

select from the plurality of classification models a low accuracy classification model having an accuracy score lower than a threshold criterion;

select from the plurality of classification models a higher accuracy classification model having an accuracy score that is higher than the accuracy score of the low accuracy classification model;

update the set of candidate factors used to train the low accuracy classification model by replacing at least one candidate factor in the set of candidate factors used to train the low accuracy classification model with a candidate factor in the set of candidate factors used to train the higher accuracy classification model; and update the low accuracy classification model by repeating the training of the classification model, the validating of the classification model, and the adjusting of the factor weights, using the updated set of candidate factors, updating of the low accuracy classification model improving performance accuracy of the low accuracy classification model; and run the updated low accuracy classification model to predict potential runtime computer operation problems, wherein responsive to the predicted potential runtime computer operation problems, an alert is generated to prevent the predicted potential runtime computer operation problems from occurring.

18. The system of claim 17, wherein the computer processor is further configured to:

for the set in the plurality of sets of candidate factors, train a transformer with encoder and decoder architecture to generate future values for at least some of the candidate factors in the set, wherein the device is caused to repeat the training of the transformer along with repeating of the training of the classification model, the validation of the classification model, and the adjusting of the factor weights, for all sets in the plurality of sets of candidate factors, wherein a plurality of transformers are trained corresponding to the respective plurality of sets of candidate factors; and the computer processor configured to update the low accuracy classification model includes the computer processor configured to update the low accuracy classification model by repeating the training of the transformer, the training of the classification model, the validating of the classification model, and the adjusting of the factor weights, using the updated set of candidate factors.

19. The system of claim 18, wherein the computer processor is further configured to pass a new set of feature values corresponding to the updated set of candidate factors to the transformer trained using the updated set of candidate factor to generate future values corresponding to the updated set of candidate factors, and using the generated future values as input to the updated low accuracy classification model to predict a future problem possibility.

20. The system of claim 18, wherein the computer processor is further configured to repeat the selecting of the low accuracy classification model, the selecting of the higher accuracy classification model, the updating of the set of candidate factors used to train the low accuracy classification model, and the updating of the low accuracy classification model, until all low accuracy classification models in the plurality of classification models are updated.

* * * * *